United States Patent
Lee et al.

(10) Patent No.: US 7,248,851 B2
(45) Date of Patent: *Jul. 24, 2007

(54) METHOD FOR CONTROLLING ROUTING INFORMATION FOR INTELLECTUAL PERIPHERALS IN SUBSCRIBER-BASED RING-BACK-TONE-SERVICE

(75) Inventors: Sang-Yoen Lee, Kyungki-do (KR); Hee-Hyuk Ham, Seoul (KR); Ki-Moon Kim, Inchon (KR); Young-Tae Noh, Seoul (KR); Jae-Young Park, Kyungki-do (KR)

(73) Assignee: SK Telecom Co., Ltd., Seoul (KR)

( * ) Notice: Subject to any disclaimer, the term of this patent is extended or adjusted under 35 U.S.C. 154(b) by 143 days.

This patent is subject to a terminal disclaimer.

(21) Appl. No.: 10/525,922

(22) PCT Filed: Aug. 7, 2003

(86) PCT No.: PCT/KR03/01588
§ 371 (c)(1),
(2), (4) Date: Feb. 25, 2005

(87) PCT Pub. No.: WO2004/023829
PCT Pub. Date: Mar. 18, 2004

(65) Prior Publication Data
US 2006/0135158 A1    Jun. 22, 2006

(30) Foreign Application Priority Data
Sep. 5, 2002    (KR) .............. 10-2002-0053607

(51) Int. Cl.
*H04M 9/00* (2006.01)
*H04M 3/42* (2006.01)
*H04B 1/38* (2006.01)

(52) U.S. Cl. .............. 455/401; 455/567; 455/414.1; 379/207.16

(58) Field of Classification Search ............ 379/207.2, 379/207.16, 219, 220.01, 229, 230, 251, 379/252, 257; 455/401, 567, 414.1
See application file for complete search history.

(56) References Cited

U.S. PATENT DOCUMENTS
4,811,382 A * 3/1989 Sleevi ................ 379/67.1
(Continued)

FOREIGN PATENT DOCUMENTS
KR    2002-56833 A    7/2002
(Continued)

*Primary Examiner*—Naghmeh Mehrpour
(74) *Attorney, Agent, or Firm*—Harness, Dickey & Pierce, PLC

(57) ABSTRACT

A method for controlling routing information for intellectual peripherals (IPs) in a subscriber-based ring-back-tone service. The routing information to be routed to IPs (50) corresponding to subscribers is classified on a subscriber telephone number-by-number basis, a subscriber telephone office number-by-number basis, a subscriber telephone office number group-by-group basis or a subscriber's major activity area-by-area basis according to a selection. The classified routing information is set and registered in a home location register (HLR) (10). When the HLR (10) receives a location registration request message from a terminal of an arbitrary subscriber, a corresponding routing information item to be routed to an IP (50) corresponding to the subscriber's terminal among the classified, set and registered routing information is contained within a response message to the location registration request message, and the response message is provided to a terminating mobile switching center (T MSC) (32).

4 Claims, 6 Drawing Sheets

U.S. PATENT DOCUMENTS

| | | | |
|---|---|---|---|
| 5,926,537 A | 7/1999 | Birze | |
| 6,603,844 B1* | 8/2003 | Chavez et al. | 379/114.13 |
| 2005/0207555 A1* | 9/2005 | Lee et al. | 379/207.16 |

FOREIGN PATENT DOCUMENTS

| | | |
|---|---|---|
| WO | 01/91370 A | 11/2001 |

* cited by examiner

METHOD FOR CONTROLLING ROUTING INFORMATION FOR INTELLECTUAL PERIPHERALS IN SUBSCRIBER-BASED RING-BACK-TONE-SERVICE

TECHNICAL FIELD

The present invention relates to a method for controlling routing information for intelligent peripherals (IPs) in a subscriber-based ring-back-tone service, and more particularly to a method for controlling routing information from mobile switching centers (MSCs) of a mobile communication network to intelligent peripherals (IPs) which provide ring back tones in the form of specified sounds, when implementing a subscriber-based ring-back-tone service for improving an existing uniform ring-back-tone service by providing the specified sounds desired by called subscribers as the ring back tones.

BACKGROUND ART

There is conventionally used a method for allowing a terminating mobile switching center (MSC) to provide a uniform ring back tone to a caller when the caller tries to make a telephone call in an existing mobile communication network. However, since the conventional method uniformly provides the same ringing tone, the caller cannot determine the existence of a wrong connection until a called party makes a response.

There has been recently proposed a method for providing advertising jingles in place of the uniform ring back tone. The proposed method provides a specified advertising jingle selected by a communication network provider to a subscriber. At this time, the subscriber is not entitled to select a desired advertising jingle. Where the subscriber hears the specified advertising jingle, the communication network provider provides a predetermined free tall time to the caller. The proposed method also has a problem that the caller cannot determine the existence of a wrong connection until a called party makes a response. Furthermore, the proposed method has another problem that various ring back tones desired by the subscriber cannot be provided.

To address the above-described problems, methods for providing a subscriber-based ring-back-tone service which services, to the caller, a specified sound registered or selected by the called subscriber in place of an existing ring back tone, have been previously proposed by the applicant of the present invention. The previously proposed methods will be described with reference to FIGS. 1 and 2.

FIG. 1 is a flowchart illustrating a method for providing the subscriber-based ling-back-tone service using a terminating mobile switching center (MSC) previously proposed by the applicant of the present invention. This method is disclosed in Korean Patent Application No. 2002-0010006 filed on Feb. 25, 2002.

First, if an arbitrary caller sends a call connection request to a service subscriber (hereinafter, referred to as a "called subscriber") using the caller's terminal (hereinafter, referred to as a "calling terminal"), a corresponding originating MSC (O_MSC) 31 requests that a home location register (HLR) 10 provide destination location information (S101).

In response to the destination location information request, the HLR 10 requests that a terminating MSC (T_MSC) 32 provide routing information (S102). The T_MSC 32 provides, to the HLR 10, the routing information, i.e., a temporary local directory number (TLDN), as a response to the request (S103).

The HLR 10 makes a response to the destination location information request contained at the above step S101 by sending the routing information to the O_MSC 31 (S104). Then, the O_MSC 31 sends an ISDN User Part (ISUP) call connection request to the T_MSC 32 on the basis of the routing information and then establishes a communication path between the O_MSC 31 and the T_MSC 32(S105).

If the T_MSC 32 receives location information of a corresponding called terminal from the HLR 10 when registering the location information of the corresponding called terminal therein, and then determines that the called terminal corresponds to a service subscriber and is in a service activation state on the basis of service setting information and routing information to be routed to an intellectual peripheral (IP) 50 previously stored in its own device (or a visitor location register (VLR)), the T_MSC 32 sends the ISUP call connection request to the IP 50, establishes a trunk communication path between the T_MSC 32 and the IP 50 and provides originating and terminating telephone numbers to the IP 50 (S106). As a result, a common communication path is established between the O_MSC 31, the T_MSC 32 and the IP 50. For reference, the service setting information and routing information are contained in a location registration response message that is sent from the HLR 10 to the T_MSC 32 when the location information of the corresponding called terminal is registered.

On the basis of the originating and terminating telephone numbers, the IP 50 requests that an IP server 70 provide a sound code (S107). In response to the request, the IP server 70 searches for the sound code linked to the received originating and terminating telephone numbers and transfers the searched sound code to make a response to the request contained at the above step S107 (S108). The IP 50 sends a replacement sound corresponding to the transferred sound code to the calling terminal through the established communication path in place of a ring back tone (S109).

If the called subscriber receives a telephone call while the replacement sound is transferred in place of the ring back tone, the T_MSC 32 recognizes the fact that the called subscriber has received the telephone call, and sends an ISUP call release request to the IP 50 so that the IP 50 can release an ISUP call (S110). Simultaneously, communication between the caller and the called subscriber is performed over the communication path between the O_MSC 31 and the T_MSC 32 (S111).

FIG. 2 is a flowchart illustrating a method for providing the subscriber-based ring-back-tone service using an originating mobile switching center (MSC) previously proposed by the applicant of the present invention. This method is disclosed in Korean Patent Application No. 2002-0047212 filed on Aug. 9, 2002.

First, if an arbitrary caller sends a call connection request to a terminal (or called terminal) of a service subscriber hereinafter, referred to as a "called subscriber") using the caller's terminal (hereinafter, referred to as a "calling terminal"), a corresponding originating MSC (O_MSC) 31 requests that a home location register (HLR) 10 provide destination location information (S201).

In response to the destination location information request, the HLR 10 requests that a terminating MSC (T_MSC) 32 provide routing information (S202). The T-MSC 32 provides, to the HLR 10, the routing information, i.e., a temporary local directory number (TLDN), as a response to the request (S203).

The HLR 10 makes a response to the destination location information request contained at the above step S201 by sending the routing information to the O_MSC 31. When making the response, the HLR 10 confirms a subscriber profile and determines whether a corresponding called party is a service subscriber, i.e., whether the called terminal is subscribed to the service (S204).

If the corresponding called party is not a service subscriber, the HLR 10 contains only the TLDN within a response message to the destination location information request, and sends the response message to the O_MSC 31 (S205-1). On the other hand, if the corresponding called party is the service subscriber, the HLR 10 contains service setting information and routing information (e.g., routing digits used for routing information to an intellectual peripheral (IP) 50) to be routed to the IP 50 within the response message, and sends the response message to the O_MSC 31 (S205-2).

In response to the response message from the HLR 10 according to a result of the performance of the above step S205-1 or S205-2, the O_MSC 31 sends a trunk (or ISUP) call connection request to only the T-MSC 32 and then establishes a communication path between the O_MSC 31 and the T_MSC 32 (S206). At this time, the O_MSC 31 selectively sends the ISUP call connection request to the IP 50 and then establishes a communication path between the O_MSC 31 and the IP 50 (S207).

If the communication path has been established between the O_MSC 31 and the IP 50 at the above step S207, the IP 50 requests an IP server 70 to provide a sound code on the basis of originating and terminating telephone numbers (S208). In response to the request, the IP server 70 searches for the sound code linked to received originating and terminating telephone numbers and transfers the searched sound code to make a response to the sound code request contained at the above step S208 (S209). The IP 50 sends a replacement sound corresponding to the transferred sound code to the calling terminal through the established communication path in place of a ring back tone (S210).

If the called terminal receives a telephone call while the replacement sound is transferred in place of the ring back tone, the O_MSC 31 recognizes the fact that the called terminal has received the telephone call and sends an ISUP call release request to the IP 50 so that the IP 50 can release an ISUP call (S211). Simultaneously, communication between a caller and a called subscriber is performed over the communication path between the O_MSC 31 and the T_MSC 32 (S212).

Since the number of service subscribers is small when a service is initially provided, a single IP 50 or a small number of IPs 50 are shared between a plurality of MSCs 31 and 32 that are distributed throughout the nation. However, where the number of service subscribers increases, there is a problem in that trunk resources coupled to the single IP 50 or the small number of IPs 50 are concentratedly and excessively occupied and hence a service disable state can be caused.

DISCLOSURE OF THE INVENTION

Therefore, the present invention has been made in view of the above problems, and it is an object of the present invention to provide a method for controlling routing information for intellectual peripherals (IPs) in a subscriber-based ring-back-tone service, which can appropriately provide the service and prevent a service disable state by efficiently employing trunk resources coupled between mobile switching centers (MSCs) and IPs.

In accordance with the first aspect of the present invention, the above and other objects can be accomplished by the provision of a method for controlling routing information for intellectual peripherals (IPs) in a subscriber-based ring-back-tone service, the routing information being controlled by a home location register (HLR) while the subscriber-based ring-back-tone service is processed using a terminating mobile switching center, comprising the steps of: (a) classifying the routing information to be routed to the IPs corresponding to subscribers on a subscriber telephone number-by-number basis, a subscriber telephone office number-by-number basis, a subscriber telephone office number group-by-group basis or a subscriber's major activity area-by-area basis in response to a selection, and setting and registering the classified routing information in the HLR; and (b) when the HLR receives a location registration request message from a terminal of an arbitrary subscriber, allowing the HLR to contain, within a response message to the location registration request message, a corresponding routing information item to be routed to an IP corresponding to the subscriber's terminal among the classified, set and registered routing information and to provide the response message to a corresponding mobile switching center.

In accordance with the second aspect of the present invention, the above and other objects can be accomplished by the provision of a method for controlling routing information for intellectual peripherals (IPs) in a subscriber-based ring-back-tone service, the routing information being controlled by a home location register (HLR) while the subscriber-based ring-back-tone service is processed using an originating mobile switching center, comprising the steps of: (a) classifying the routing information to be routed to the IPs corresponding to subscribers on a subscriber telephone number-by-number basis, a subscriber telephone office number-by-number basis, a subscriber telephone office number group-by-group basis or a subscriber's major activity area-by-area basis in response to a selection, and setting and registering the classified routing information in the HLR; and (b) when the HLR receives a destination location information request message from the originating mobile switching center according to a call connection request from a calling terminal to a called terminal, allowing the HLR to contain, within a response message to the destination location information request message, a corresponding routing information item to be routed to an IP corresponding to the subscriber's called terminal among the classified, set and registered routing information and to provide the response message to the originating mobile switching center.

In accordance with the fist and second aspects, a large number of IPs may be preferably configured so that sounds for subscribers associated with the routing information classified on the subscriber telephone number-by-number basis the subscriber telephone office number-by-number basis, the subscriber telephone office number group-by-group basis or the subscriber's major activity area-by-area basis can be distributed.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Now, a method for controlling routing information for intellectual peripherals (IPs) in a subscriber-based ring-back-tone service in accordance with preferred embodiments of the present invention will be described in detail with reference to the annexed drawings.

Figure 3:
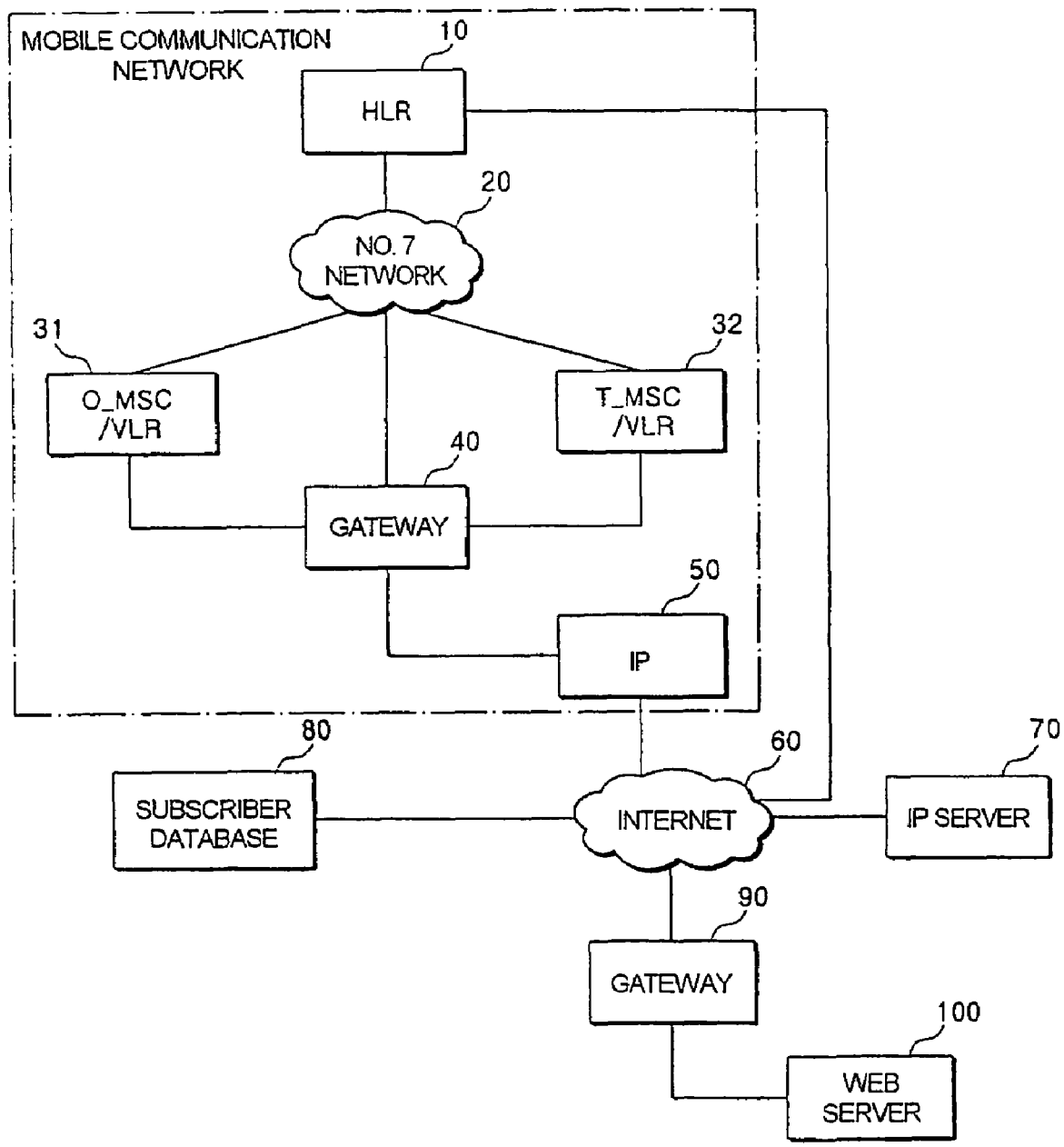
FIG. 3 is a block diagram illustrating a subscriber-based ring-back-tone service system to which a method of the present invention is applied.

FIG. 3 is a block diagram illustrating a subscriber-based ring-back-tone service system to which the method of the present invention is applied. As shown in FIG. 3, the system includes a home location registers (HLR) 10; an originating mobile switching center/visitor location register (O_MSC/VLR) 31 and a terminating mobile switching center/visitor location register (T_MSC/VLR) 32 for communicating with the HLR 10 over a signalling system (SS) No. 7 network based on signalling transfer protocol (STP); an intellectual peripheral (IP) 50 coupled to a gateway (CGS) for communicating with the O_MSC/VLR 31 and the T_MSC/VLR 32; an IP server 70 for communicating data with the IP 50 over an Internet network 60; a subscriber database 80 coupled to the HLR 10 over the Internet network 60; and a web server 100 coupled to the Internet network 60 over a gateway 90 for communicating with the IP 50 and the IP server 70.

The HLR 10 has all functions as an existing network element. Further, the HLR 10 newly and additionally sets first information indicating the existence of a replacement sound for a ring back tone and second information associated with routing information to be routed to the IP 50 as called-subscriber profile information in advance. The first and second information items are set and stored as supplementary service subscription information of a called-subscriber profile.

In order for the method of the present invention to be appropriately implemented, the HLR 10 classifies the routing information of the second information on a subscriber telephone number-by-number basis, a subscriber telephone office number-by-number basis, a subscriber telephone office number group-by-group basis or a subscriber's major activity area-by-area basis in response to a selection of an operator, etc., and stores the classified information. As one example, in accordance with the first aspect of the present invention, the HLR 10 receives a location registration request message from an arbitrary subscriber, contains the routing information of the second information corresponding to the subscriber among the classified information items within a response message to the location registration request message, and provides the routing information through the response message to the T_MSC/VLR 32. As another example, in accordance with the second aspect of the present invention, the HLR 10 receives a destination location information request message from the O_MSC/VLR 31, contains the routing information linked to a corresponding called subscriber among the classified information items within a response message to the location registration request message, and provides the routing information through the response message to the O_MSC/VLR 31.

The O_MSC/VLR 31 and the T_MSC/VLR 32 have all functions as existing networks elements. As one example, in accordance with the first aspect of the present invention, the T_MSC/VLR 32 communicates with the HLR 10 to receive and store the preset first and second information items from the HLR 10 upon registering location information of a called subscriber, and communicates with the IP 50 on the basis of the stored first and second information to receive a replacement sound for the ring back tone from the IP 50 and to provide the received replacement sound for the ring back tone to a corresponding caller upon receiving a called-subscriber call connection request. As another example, in accordance with the second aspect of the present invention, the O_MSC/VLR 31 receives a destination location information response message from the HLR 10, and then not only sends a call connection request to the T_MSC/VLR 32 as in the conventional method but also simultaneously sends, to the IP 50, the call connection request on the basis of the first and second information items contained within the destination location information response message.

The IP 50 stores various sounds, and communicates with the O_MSC/VLR 31 and the T_MSC/VLR 32 over the gateway 40 to provide the stored sounds to the O_MSC/VLR 31 and the T_MSC/VLR 32. In accordance with the first and second aspects of the present invention, a plurality of IPs 50 are configured. The various sounds for subscribers corresponding to the routing information of the second information (classified on the subscriber telephone number-by-number basis, the subscriber telephone office number-by-number basis, the subscriber telephone office number group-by-group basis or the subscriber's major activity area-by-area basis) are distributed and stored in the plurality of IPs 50 on the subscriber telephone number-by-number basis, the subscriber telephone office number-by-number basis, the subscriber telephone office number group-by-group basis or the subscriber's major activity area-by-area basis. In other words, each IP 50 stores only the sounds of corresponding subscribers classified on the subscriber telephone number-by-number basis, the subscriber telephone office number-by-number basis, the subscriber telephone office number group-by-group basis or the subscriber's major activity area-by-area basis. Specific routing digits are assigned to the respective IPs 50.

The IP server 70 communicates with the IP 50 over the Internet network 60 to specify types of sounds to be provided to the O_MSC/VLR 31 and the T_MSC/VLR 32 by the IPs 50 on the basis of information selected from a group consisting of identification information associated with a called subscriber corresponding to a call connection request, identification information associated with a caller corresponding to the called subscriber, call connection request time information and other information items (or on a caller-by-caller basis, a caller group-by-group basis, a caller age-by-age basis, a caller sex-by-sex basis and/or a caller job-by-job basis). For example, if a code is assigned to each of various sounds stored in the IPs 50, a called party specifies and selects a caller, a caller group, a calling time or etc. when the called party is subscribed to the service or changes its information, and the called party specifies a sound corresponding to the caller, the caller group, the calling time or etc., information associated with the specified sound can be kept in the form of a table and corresponding sound information can be provided to the IP 50 on the basis of the table in response to a sound information request from the IP 50. Thus, the IP 50 provides a sound corresponding to sound information from the IP server 70 to the T_MSC/VLR 32.

The web server 100 is coupled to the IP 50 or the IP server 70 over the Internet network 60 and can add a new sound in the IP 50 or change information of a specified sound (corresponding to a caller, a caller group, a calling time or etc.) of the IP sever 70 and a sound code corresponding to the sound information. A subscriber can perform these addition and change operations through a web page provided by the web server 100.

Figure 4:
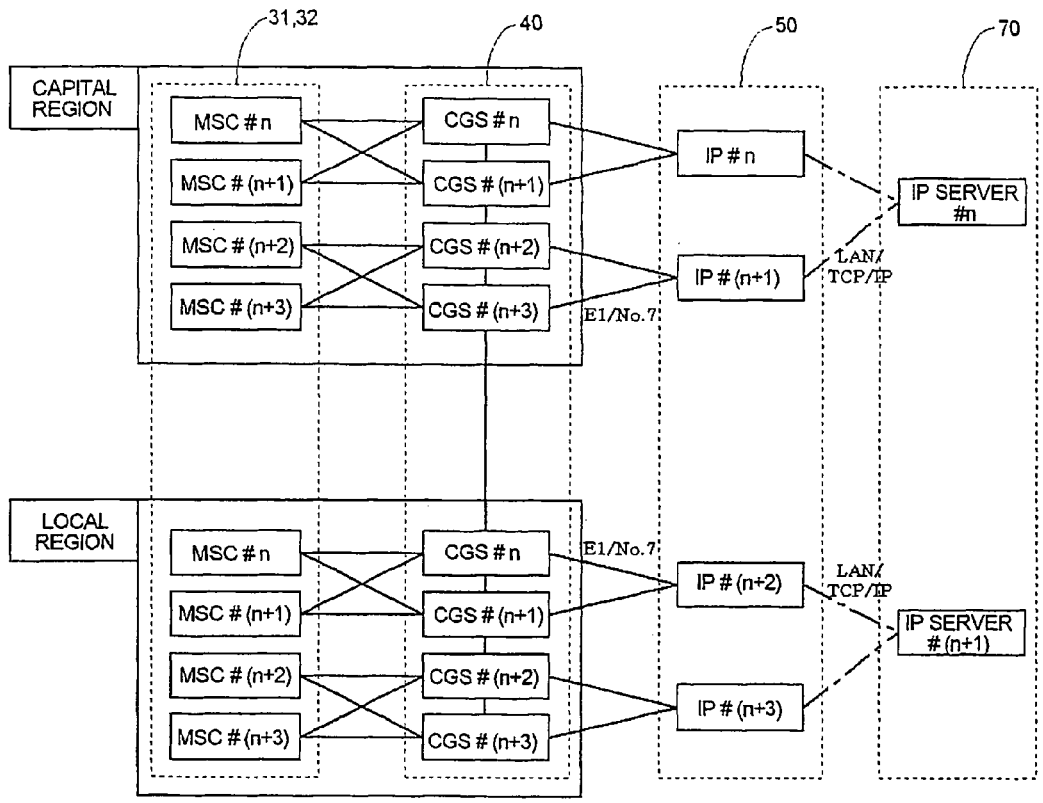
FIG. 4 is an exemplary view illustrating network connection relations between mobile switching centers (MSCs), gateways (CGSs), intellectual peripherals (IPs) and IP servers associated with the system shown in FIG. 3.

FIG. 4 is an exemplary view illustrating network connection relations between MSCs 31 and 32, gateways (CGSs) 40, intellectual peripherals (IPs) 50 and IP servers 70 associated with the system shown in FIG. 3. As shown in FIG. 4, the gateways (CGSs) 40 serve as a device for combining trunks to improve a drawback where the gateways 40 are coupled to the IPs 50 and the MSCs 31 and 32 in the form of a full mesh. In accordance with the present invention, for example, if the capacity of an IP 50 corresponding to IP#n can accommodate two hundred thousand subscribers, IP routing digits are set as IP#n connection digits for the two hundred thousand subscribers. On the other hand, if the number of subscribers exceeds two hundred thousand subscribers, a classification process is performed on the subscriber telephone number-by-number basis, the subscriber telephone office number-by-number basis, the subscriber telephone office number group-by-group basis (i.e., HLR system-by-system basis) or the subscriber's major activity area-by-area basis in response to a selection of the operator.

Further, the HLR 10 sets routing digits for IP#(n+1), IP#(n+2) and IP#(n+3) in a unit of two hundred thousand subscribers. The IPs 50 corresponding to IP#n, IP#(n+1), IP#(n+2) and IP#(n+3) have sounds for subscribers classified (on the subscriber telephone number-by-number basis, the subscriber telephone office number-by-number basis, the subscriber telephone office number group-by-group basis or the subscriber's major activity area-by-area basis) in a unit of two hundred thousand subscribers, thereby reducing trunk resources for metropolitan and rural areas, efficiently distributing and accommodating subscribers, and preventing a service disable state due to excessive consumption of trunk resources.

Figure 1:
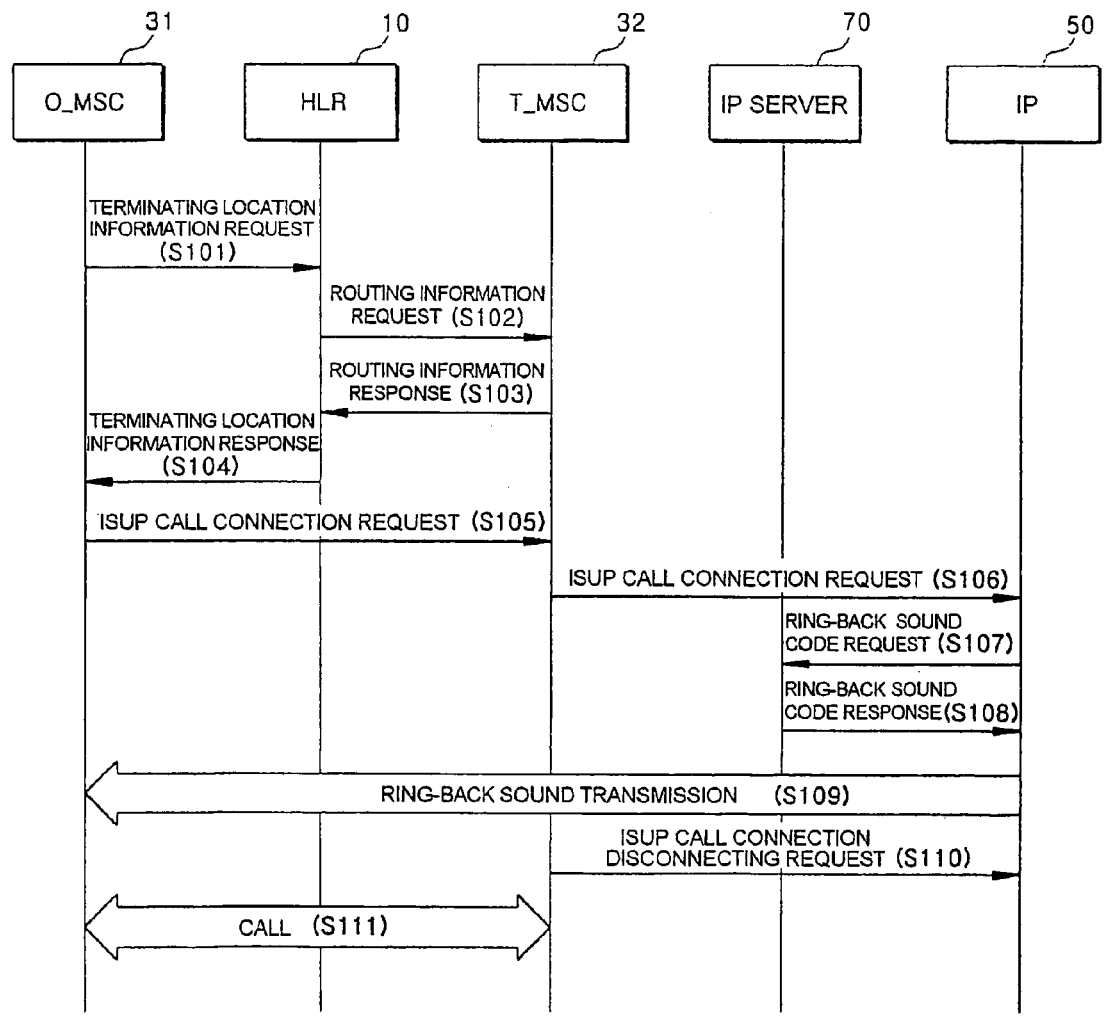
FIG. 1 is a flowchart illustrating a method for providing the subscriber-based ring-back-tone service using a terminating mobile switching center previously proposed by the applicant of the present invention.
Figure 5:
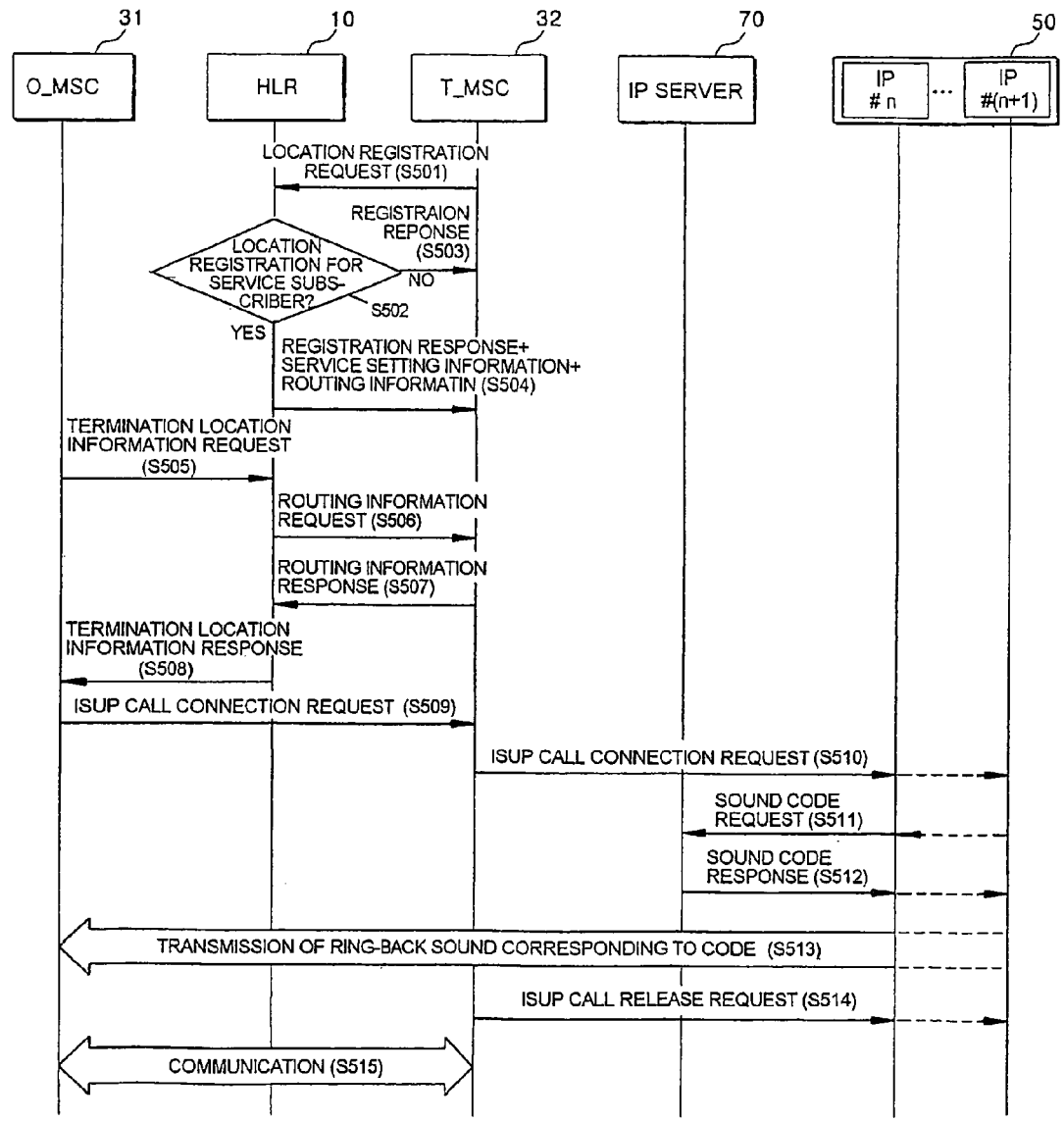
FIG. 5 is a flowchart illustrating the method for controlling routing information for IPs in a subscriber-based ring-back-tone service in accordance with the first embodiment of the present invention.

FIG. 5 is a flowchart illustrating the method for controlling routing information for IPs in the subscriber-based ring-back-tone service in accordance with the first embodiment of the present invention. In other words, FIG. 5 shows the flowchart of a routing control method performed by the HLR 10 in a procedure of processing the subscriber-based ring-back-tone service using the T_MSC 32 as in conventional method shown in FIG. 1.

First, upon receiving a location registration request message from the T_MSC 32 (S501), the HLR 10 confirms a subscriber profile and determines whether the location registration request message has been received from a subscriber of the service in accordance with the present invention, i.e., whether a terminal having transmitted a location registration request is subscribed to the service in accordance with the present invention (S502). If the service subscriber has not transmitted the location registration request, the HLR 10 transmits, to the T_MSC 32, only a location registration-related response message as in the conventional method (S503). On the other hand, if the service subscriber has transmitted the location registration request, the HLR 10 contains service setting information and routing information (e.g., routing digits used for routing information to an intellectual peripheral (IP) 50) to be sent to the IP 50 within the response message, and sends the response message to the T_MSC 32 so that the T_MSC 32 can have corresponding information (S504). Next, the above step S504 will be described in detail. If it is determined, at the above step S502, that the service subscriber has transmitted the location registration request, the HLR 10 determines whether the routing information is classified on a subscriber telephone number-by-number basis, a subscriber telephone office number-by-number basis, a subscriber telephone office number group-by-group basis (i.e., HLR system-by-system basis) or a subscriber's major activity area-by-area basis.

If the HLR 10 determines that the routing information is classified on the subscriber telephone office number-by-number basis, it searches for routing digits (hereinafter, referred to as "IP#n") for an IP 50 corresponding to a subscriber telephone office number and then provides the searched routing digits IP#n as the routing information to the T_MSC 32. As a result of operations of the above steps S501 to S504, the T_MSC 32 has the service setting information for a called subscriber and the routing information for the IP 50.

Then, if an arbitrary caller sends a call connection request to a terminal (or called terminal) of a service subscriber (hereinafter, referred to as a "called subscriber") using the caller's terminal (hereinafter, referred to as a "calling terminal"), a corresponding O_MSC 31 requests that the HLR 10 provide destination location information (S505).

In response to the destination location information request, the HLR 10 requests that the T_MSC 32 provide routing information (S506). The T_MSC 32 provides, to the HLR 10, the routing information, i.e., a temporary local directory number (TLDN), as a response to the request (S507).

The HLR 10 makes a response to the destination location information request contained at the above step S505 by providing the TLDN routing information to the O_MSC 31 (S508). Then, the O_MSC 31 sends an ISUP call connection request to the T_MSC 32 on the basis of the TLDN routing information so that a trunk communication path can be established between the O_MSC 31 and the T_MSC 32 (S509).

If the T_MSC 32 confirms service setting information stored (at the above step 504) in its own device and determines that a corresponding called subscriber is a service subscriber and is in a service activation state, the T_MSC 32 sends the ISUP call connection to the IP 50 corresponding to routing digits IP#n among the IPs 50 on the basis of the routing digits IP#n being the routing information for the IP 50 stored at the above S504 and establishes a communication path between the T_MSC 32 and the IP 50 corresponding to the routing digits IP#n. The T_MSC 32 provides originating and terminating telephone numbers to the IP 50 along with the ISUP call connection request (S510).

As a result, a communication path is established between the O_MSC 31, the T_MSC 32 and the IP 50 corresponding to the routing digits IP#n.

If routing digits received from the HLR 10 at the above step S504 are IP#(n+1) rather than IP#n as an example, the T_MSC 32 sends the ISUP call connection request to the IP

50 corresponding to the routing digits IP#(n+1) and establishes a communication path between the T_MSC 32 and the IP 50 corresponding to the routing digits IP#(n+1) at the above step S510.

After the above step S510, the IP 50 having the routing digits IP#n requests the IP server 70 to provide a sound code on the basis of the originating and terminating telephone numbers received at the above step S10 (S511). In response to the request, the IP server 70 searches for the sound code linked to the received originating and terminating telephone numbers and provides, to the IP 50, the searched sound code as a response to the request contained at the above step S511 (S512). The IP 50 having the routing digits IP#n sends a replacement sound corresponding to the transferred sound code to the calling terminal through the established communication path in place of a ring back tone (S513).

If the called subscriber receives a telephone call while the replacement sound is transferred in place of the ring back tone, the T_MSC 32 recognizes the fact that the called subscriber has received the telephone call and sends an ISUP call release request to the IP 50 having the routing digits IP#n so that a trunk call associated with the IP 50 having the routing digits IP#n can be released (S514). Simultaneously, communication between the caller and the called subscriber is performed over the communication path between the O_MSC 31 and the T_MSC 32 (S515).

Figure 2:
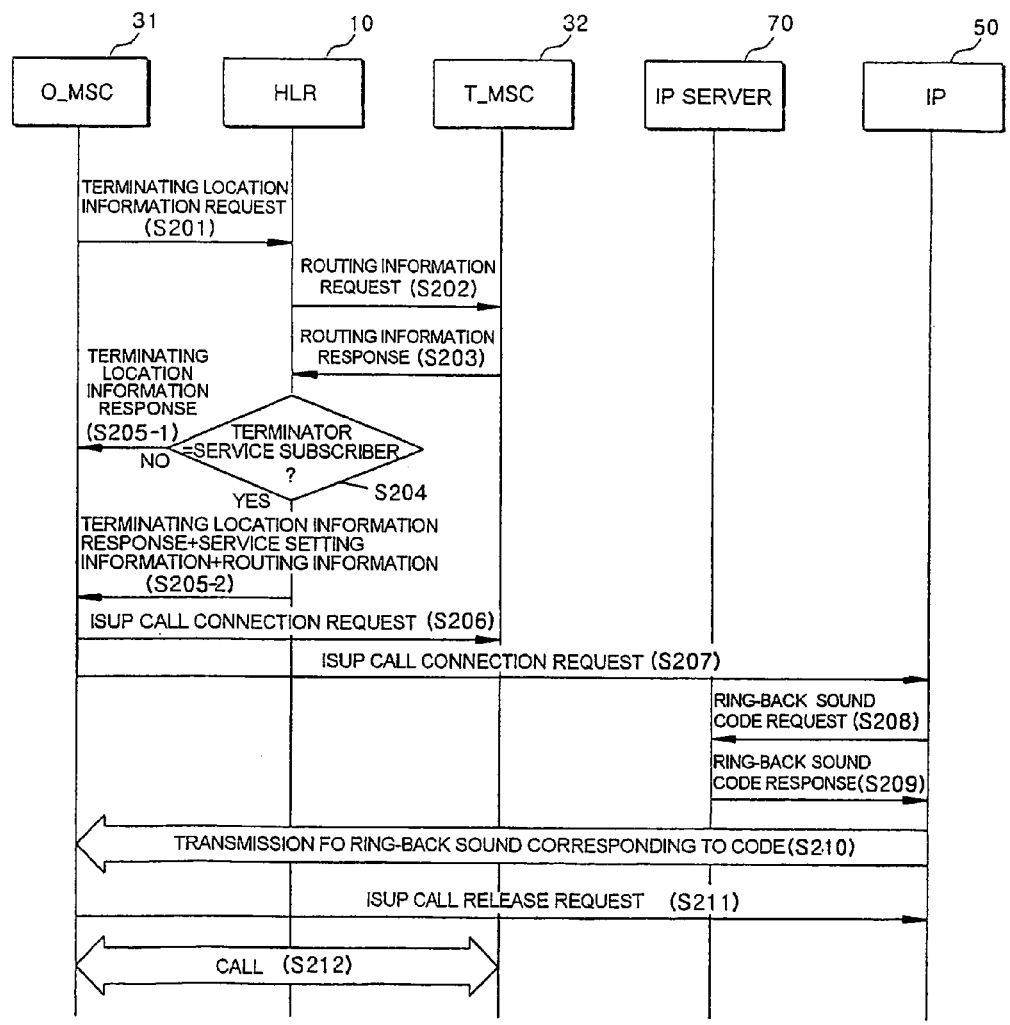
FIG. 2 is a flowchart illustrating a method for providing the subscriber-based ring-back-tone service using an originating mobile switching center previously proposed by the applicant of the present invention.
Figure 6:
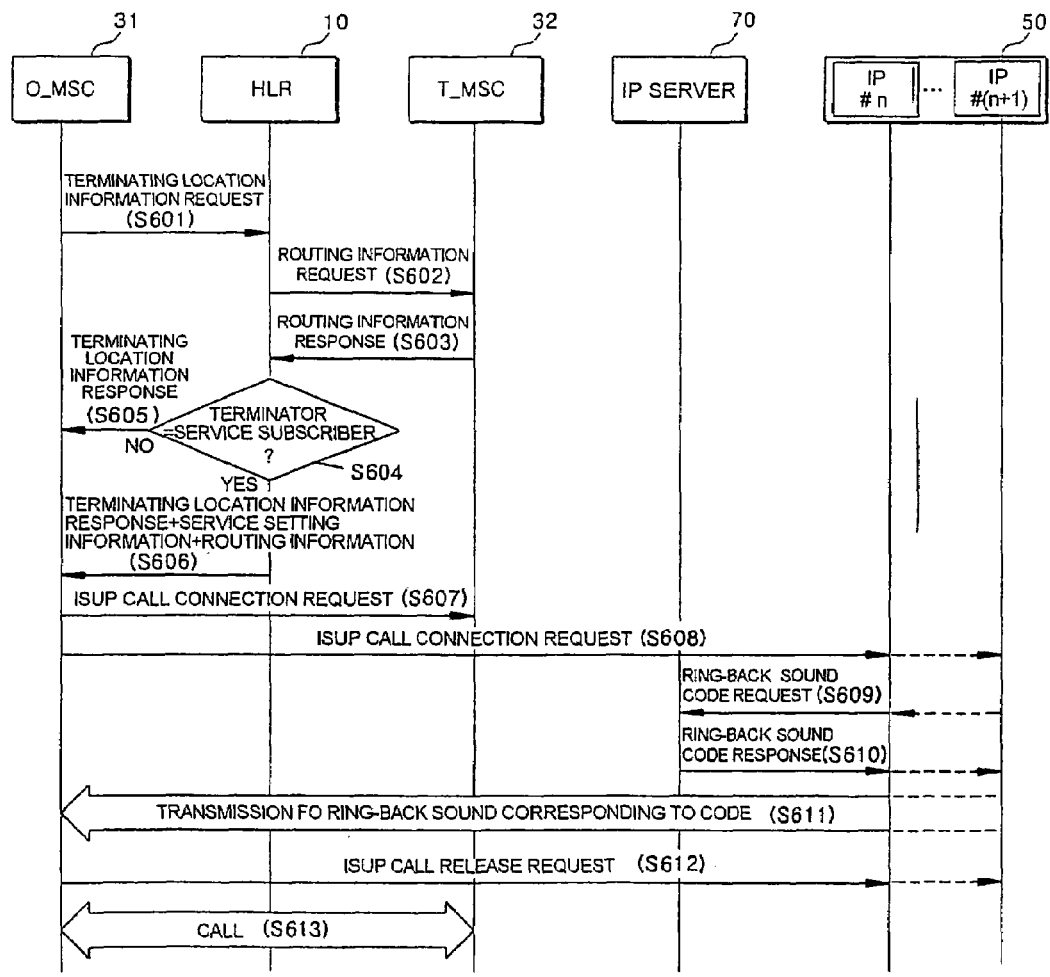
FIG. 6 is a flowchart illustrating the method for controlling routing information for IPs in the subscriber-based ring-back-tone service in accordance with the second embodiment of the present invention.

FIG. 6 is a flowchart illustrating the method for controlling routing information for IPs in the subscriber-based ring-back-tone service in accordance with the second embodiment of the present invention. FIG. 6 shows the flowchart of a routing control method performed by the HLR 10 in a procedure of processing the subscriber-based ring-back-tone service using the O_MSC 31 as in the conventional method shown in FIG. 2.

First, if an arbitrary caller sends a call connection request to a terminal (or called terminal) of a service subscriber (hereinafter, referred to as a "called subscriber") using the caller's terminal (hereinafter, referred to as a "calling terminal"), a corresponding O_MSC 31 requests that the HLR 10 provide destination location information (S601).

In response to the destination location information request, the HLR 10 requests that the T_MSC 32 provide routing information (S602). The T_MSC 32 provides, to the HLR 10, the routing information, i.e., a temporary local directory number (TLDN), as a response to the request (S603).

The HLR 10 makes a response to the destination location information request contained at the above step S601 by sending the routing information to the O_MSC 31. When making the response, the HLR 10 confirms a subscriber profile and determines whether a corresponding called party is a service subscriber, i.e., whether the called terminal is subscribed to the service in accordance with the present invention (S604). If the corresponding called party is not the service subscriber, the HLR 10 contains only the TLDN within a response message to the destination location information request, and sends the response message to the O_MSC 31 as in the conventional method (S605). On the other hand, if the corresponding called party is the service subscriber, the HLR 10 contains service setting information and routing information (e.g., routing digits used for routing information to an IP 50) to be sent to the IP 50 within the response message, and sends the response message to the O_MSC 31 (S606).

Next, the above step S606 will be described in detail. If it is determined, at the above step S604, that the called party is the service subscriber, the HLR 10 determines whether the routing information to be sent to the IP 50 is classified on a subscriber telephone number-by-number basis, a subscriber telephone office number-by-number basis, a subscriber telephone office number group-by-group basis (i.e., HLR system-by-system basis) or a subscriber's major activity area-by-area basis. If the HLR 10 determines that the routing information is classified on the subscriber telephone office number-by-number basis, it searches for routing digits IP#n or IP#(n+1) (referred to as "IP#n" in this embodiment) for an IP 50 corresponding to a subscriber telephone office number and provides the searched routing digits IP#n to the T_MSC 32.

In response to the response message from the HLR 10 according to a result of the performance of the above step S605 or S606, the O_MSC 31 sends a trunk (or ISUP) call connection request to only the T_MSC 32 and then establishes a communication path between the O_MSC 31 and the T_MSC 32 (S607). At this time, the O_MSC 31 selectively sends an ISUP call connection request to the IP 50 having the routing digits IP#n and then establishes a communication path between the O_MSC 31 and the IP 50 (S608). In this embodiment, the above steps S607 and S608 are simultaneously performed since the called party is the subscriber of the service in accordance with the present invention.

If routing digits received from the HLR 10 at the above step S606 are IP#(n+1) rather than IP#n as an example, the O_MSC 31 sends the ISUP call connection request to the IP 50 corresponding to the routing digits IP#(n+1) and establishes a communication path between the O_MSC 31 and the IP 50 corresponding to the routing digits IP#(n+1) at the above step S608.

If the communication path has been established between the O_MSC 31 and the IP 50 corresponding to the routing digits IP#(n+1) at the above step S608, the IP 50 having the routing digits IP#n requests the IP server 70 to provide a sound code on the basis of the originating and terminating telephone numbers (S609). In response to the request, the IP server 70 searches for the sound code linked to the received originating and terminating telephone numbers and transfers the searched sound code as a response to the request contained at the above step S609 (S610). The IP 50 having the routing digits IP#n sends a replacement sound corresponding to the transferred sound code to the calling terminal through the established communication path in place of a ring back tone (S611).

If the called subscriber receives a telephone call while the replacement sound is transferred in place of the ring back tone, the O_MSC 31 recognizes the fact that the called subscriber has received the telephone call and sends an ISUP call release request to the IP 50 having the routing digits IP#n so that a trunk call associated with the IP 50 having the routing digits IP#n can be released (S612). Simultaneously, communication between the caller and the called subscriber is performed over the communication path between the O_MSC 31 and the T_MSC 32 (S613).

INDUSTRIAL APPLICABILITY

As apparent from the above description, the present invention provides a method for controlling routing information for intellectual peripherals (IPs) in a subscriber-based ring-back-tone service, which can efficiently employ trunk resources coupled between mobile switching centers (MSCs) and IPs by changing routing digits on a subscriber telephone number-by-number basis, a subscriber telephone office number-by-number basis, a subscriber telephone office number group-by-group basis (i.e., home location register (HLR) system-by-system basis) or a subscriber's major activity area-by-area basis according to a selection of an operator, thereby preventing over-loading of trunk resources and preventing a service disable state due to excessive consumption of the trunk resources coupled from the MSCs to the IPs.

Furthermore, the method of the present invention enables service subscribers to be efficiently distributed and connected to corresponding IPs according to a routing control operation of an HLR on the basis of IP capacities in a state where a small number of IPs are shared between a large number of MSCs at a service initial time, thereby preventing over-loading of trunk resources and preventing a service disable state due to excessive consumption of the trunk resources.

Although the present invention has been described in connection with specific preferred embodiments, those skilled in the art will appreciate that various modifications, additions, and substitutions to the specific elements are possible, without departing from the scope and spirit of the present invention as disclosed in the accompanying claims.

The invention claimed is:

1. A method for controlling routing information for intellectual peripherals (IPs) in a subscriber-based ring-back-tone service, the routing information being controlled by a home location register (HLR) while the subscriber-based ring-back-tone service is processed using a terminating mobile switching center, comprising the steps of:

(a) classifying the routing information to be routed to the IPs corresponding to subscribers on a subscriber telephone number-by-number basis, a subscriber telephone office number-by-number basis, a subscriber telephone office number group-by-group basis or a subscriber's major activity area-by-area basis in response to a selection, and setting and registering the classified routing information in the HLR; and (b) when the HLR receives a location registration request message from a terminal of an arbitrary subscriber, allowing the HLR to contain, within a response message to the location registration request message, a corresponding routing information item to be routed to an IP corresponding to the subscriber's terminal among the classified, set and registered routing information and to provide the response message to a corresponding mobile switching center.

2. A method for controlling routing information for intellectual peripherals (IPs) in a subscriber-based ring-back-tone service, the routing information being controlled by a home location register (HLR) while the subscriber-based ring-back-tone service is processed using an originating mobile switching center, comprising the steps of:

(a) classing the routing information to be routed to the IPs corresponding to subscribers on a subscriber telephone number-by-number basis, a subscriber telephone office number-by-number basis, a subscriber telephone office number group-by-group basis or a subscriber's major activity area-by-area basis in response to a selection, and setting and registering the classified routing information in the HLR; and (b) when the HLR receives a destination location information request message from the originating mobile switching center according to a call connection request from a calling terminal to a called terminal, allowing the HLR to contain, within a response message to the destination location information request message, a corresponding routing information item to be routed to an IP corresponding to the subscriber's called terminal among the classified, set and registered routing information and to provide the response message to the originating mobile switching center.

3. The method as set forth in claim 1, wherein a large number of IPs are configured so that sounds for subscribers associated with the routing information classified on the subscriber telephone number-by-number basis, the subscriber telephone office number-by-number basis, the subscriber telephone office number group-by-group basis or the subscriber's major activity area-by-area basis can be distributed.

4. The method as set forth in claim 2, wherein a large number of IPs are configured so that sounds for subscribers associated with the routing information classified on the subscriber telephone number-by-number basis, the subscriber telephone office number-by-number basis, the subscriber telephone office number group-by-group basis or the subscriber's major activity area-by-area basis can be distributed.

* * * * *